US010706502B2

(12) United States Patent
Saito

(10) Patent No.: US 10,706,502 B2
(45) Date of Patent: Jul. 7, 2020

(54) MONITORING SYSTEM

(71) Applicants: Kabushiki Kaisha Toshiba, Minato-ku (JP); Toshiba Infrastructure Systems & Solutions Corporation, Kawasaki-shi (JP)

(72) Inventor: Hiroo Saito, Kawasaki (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 111 days.

(21) Appl. No.: 16/136,912

(22) Filed: Sep. 20, 2018

(65) Prior Publication Data

US 2019/0087937 A1 Mar. 21, 2019

(30) Foreign Application Priority Data

Sep. 21, 2017 (JP) ................. 2017-180836

(51) Int. Cl.
*G06K 9/36* (2006.01)
*G06T 3/40* (2006.01)
(Continued)

(52) U.S. Cl.
CPC ........ *G06T 3/4038* (2013.01); *G06K 9/00228* (2013.01); *G06K 9/00261* (2013.01);
(Continued)

(58) Field of Classification Search
CPC . G06T 7/248; G06T 7/30; G06T 2207/30201; G06T 2207/30232;
(Continued)

(56) References Cited

U.S. PATENT DOCUMENTS 9,858,474 B2\* 1/2018 Brewer ............. G06K 9/00302
2003/0039380 A1\* 2/2003 Sukegawa .......... G06K 9/00288
382/118
(Continued)

FOREIGN PATENT DOCUMENTS

| JP | 2000-99690 | 4/2000 |
| JP | 2007-226741 | 9/2007 |
| JP | 2014-22970 | 2/2014 |
| JP | 5454233 | 3/2014 |
| JP | 5753966 | 7/2015 |

*Primary Examiner* — Samir A Ahmed
(74) *Attorney, Agent, or Firm* — Oblon, McClelland, Maier & Neustadt, L.L.P.

(57) ABSTRACT

According to one embodiment, a monitoring system includes a monitoring terminal and a server. The monitoring terminal includes a detector, a tracking unit, a first selector, and a transmitter. The server includes a receiver, a second selector, a collation unit, and an output unit. The receiver receives a first best shot images from the monitoring terminal. The second selector performs second selection processing, as part of a predetermined selection processing other than a first selection processing, of selecting a second best shot image suitable for collation with a predetermined image from among the first best shot images. The collation unit performs collation processing of collating the second best shot image with the predetermined image. The output unit outputs a result of the collation processing.

5 Claims, 5 Drawing Sheets

(51) Int. Cl.
*G06T 7/20* (2017.01)
*G06T 7/30* (2017.01)
*G06K 9/62* (2006.01)
*G06K 9/00* (2006.01)
*G06T 7/246* (2017.01)

(52) U.S. Cl.
CPC ....... *G06K 9/00771* (2013.01); *G06K 9/6215* (2013.01); *G06K 9/6255* (2013.01); *G06T 7/20* (2013.01); *G06T 7/248* (2017.01); *G06T 7/30* (2017.01); *G06T 2207/10016* (2013.01); *G06T 2207/30201* (2013.01); *G06T 2207/30232* (2013.01)

(58) Field of Classification Search
CPC ...... G06T 2207/10016; G06K 9/00771; G06K 9/00261; G06K 9/6255; G06K 9/6215; G06K 9/00228
See application file for complete search history.

(56) References Cited

U.S. PATENT DOCUMENTS

| | | | |
|---|---|---|---|
| 2007/0025722 A1* | 2/2007 | Matsugu | G03B 17/16 396/263 |
| 2007/0297652 A1* | 12/2007 | Nishiyama | G06K 9/00255 382/118 |
| 2010/0066847 A1* | 3/2010 | Suzuki | G02B 7/102 348/222.1 |
| 2010/0141763 A1* | 6/2010 | Itoh | G06K 9/00771 348/143 |
| 2013/0129160 A1 | 5/2013 | Yamada et al. | |
| 2014/0023247 A1 | 1/2014 | Kuwahara et al. | |
| 2015/0278585 A1* | 10/2015 | Laksono | G06K 9/00288 382/103 |
| 2016/0034751 A1* | 2/2016 | Brewer | G06K 9/00295 382/103 |
| 2019/0057250 A1* | 2/2019 | Brewer | G06K 9/00771 |

* cited by examiner

MONITORING SYSTEM

CROSS-REFERENCE TO RELATED APPLICATIONS

This application is based upon and claims the benefit of priority from Japanese Patent Application No. 2017-180836, filed Sep. 21, 2017, the entire contents of which are incorporated herein by reference.

FIELD

Embodiments described herein relate generally to a monitoring system.

BACKGROUND

Monitoring systems have been developed, the monitoring systems including a monitoring terminal that searches for an object set in advance by performing collation processing between an image of an object (for example, a person) included in a taken image obtained by imaging a predetermined position with an imaging unit and a registered image of the object set in advance.

Some of the monitoring systems extract a characteristic from the taken image obtained by imaging performed by the imaging unit, select a best shot image from the taken image based on an extraction result of the characteristic, and perform collation processing by using the best shot image. However, processing of extracting the characteristic is performed for all taken images, so that calculation cost of the monitoring terminal is increased. Some of the monitoring systems compose an image suitable for collation with the registered image by using all taken images obtained by imaging performed by the imaging unit, and performs collation processing using the composite image. However, due to the composition of the image, calculation cost of the monitoring terminal is increased.

DETAILED DESCRIPTION

In general, a monitoring system according to an embodiment includes a monitoring terminal and a server. The monitoring terminal includes a detector, a tracking unit, a first selector, and a transmitter. The detector detects object images as images of an object from frames constituting a moving image obtained by imaging a predetermined position with an imaging unit. The tracking unit tracks object images of the same object across the frames. The first selector performs first selection processing, as part of predetermined selection processing, of selecting first best shot images suitable for collation with a predetermined image from the object images of the same object. The transmitter transmits the first best shot images to the server. The server includes a receiver, a second selector, a collation unit, and an output unit. The receiver receives the first best shot image from the monitoring terminal. The second selector performs second selects processing, as part of the predetermined selection processing other than the first selection processing, of selecting a second best shot image suitable for collation with the predetermined image from among the first best shot images. The collation unit performs collation processing of collating the second best shot image with the predetermined image. The output unit outputs a result of the collation processing.

With reference to the attached drawings, the following describes a person search system and a person collation system to which the monitoring system according to the present embodiment is applied.

First Embodiment

Figure 1:
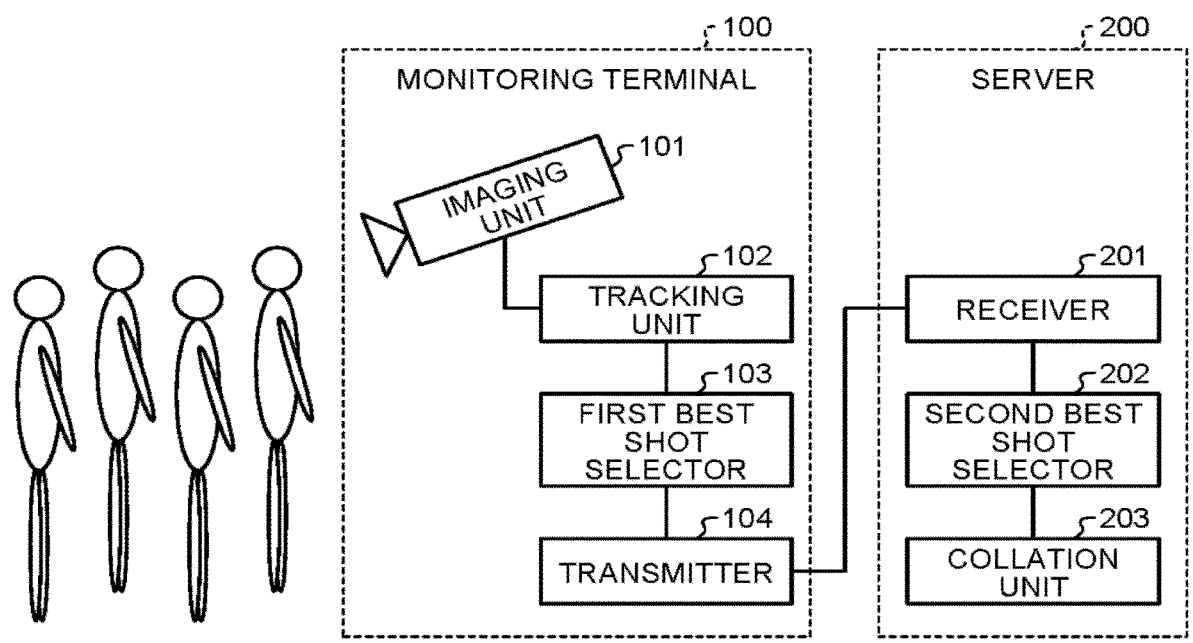
FIG. 1 is a diagram illustrating an example of a configuration of a person search system according to a first embodiment.

FIG. 1 is a diagram illustrating an example of a configuration of a person search system according to a first embodiment. The person search system according to the present embodiment includes a monitoring terminal 100 and a server 200 as illustrated in FIG. 1. The monitoring terminal 100 includes an imaging unit 101, a tracking unit 102, a first best shot selector 103, and a transmitter 104. The imaging unit 101 is arranged to be able to image a position set in advance such as a road, a station, and an airport (hereinafter, referred to as a predetermined position). The tracking unit 102 detects an image (hereinafter, referred to as a face image, which is an example of an object image) of an object (for example, a face of a person included in a blacklist and the like) from frames constituting a moving image obtained by imaging the predetermined position with the imaging unit 101. The tracking unit 102 tracks face images of the same person across the frames. In the present embodiment, the tracking unit 102 detects the face image from the frames constituting the moving image obtained by imaging performed by the imaging unit 101 included in the monitoring terminal 100. Alternatively, the tracking unit 102 may detect the face image from the frames of a moving image obtained by imaging the predetermined position with an imaging unit external to the monitoring terminal 100.

The first best shot selector 103 performs first selection processing, as part of selection processing set in advance (predetermined selection processing), of selecting first best shot images suitable for collation with an image of an object set in advance (hereinafter, referred to as registered image, which is an example of a predetermined image) from the face images of the same person tracked by the tracking unit 102. In this case, the selection processing set in advance is a candidate of processing of selecting the best shot image suitable for collation with the registered image.

In the present embodiment, the first selection processing is processing that can be performed with a calculation resource smaller than a calculation resource required for selection processing performed by the server 200. The transmitter 104 transmits the first best shot images selected by the first best shot selector 103 to the server 200. In the present embodiment, components of the monitoring terminal 100 (the tracking unit 102, the first best shot selector 103, and the transmitter 104) are implemented by a calculator (processor) the performance of which is lower than that of a calculator included in the server 200.

The server 200 includes a receiver 201, a second best shot selector 202, and a collation unit 203. The receiver 201 receives the first best shot images from the monitoring terminal 100. The second best shot selector 202 performs second selection processing, as part of the selection processing set in advance other than the first selection processing, of selecting a second best shot image suitable for collation with the registered image from among the first best shot images. In this case, the second selection processing is processing performed with a calculation resource larger than the calculation resource required for the first selection processing. That is, in the present embodiment, the person search system selects the best shot image to be collated with the registered image by the collation unit 203 in two steps by the monitoring terminal 100 and the server 200.

The collation unit 203 performs collation processing of collating the second best shot image with the registered image. The collation unit 203 outputs (displays) a result of the collation processing to a display device included in the monitoring terminal 100, the server 200, and the like. In the present embodiment, components of the server 200 (the receiver 201, the second best shot selector 202, and the collation unit 203) are implemented by a calculator (processor) the performance of which is higher than that of the calculator included in the monitoring terminal 100.

In this way, by performing the selection processing of the best shot image suitable for collation with the registered image in two steps by the monitoring terminal 100 and the server 200, the best shot image to be collated with the registered image is not necessarily selected only by the monitoring terminal 100, so that the calculation resource and calculation cost of the monitoring terminal 100 in collation processing can be reduced. Only the first best shot images among the face images detected from the frames are transmitted to the server 200, so that a transmission amount of images and the like between the monitoring terminal 100 and the server 200 can be reduced.

In the present embodiment, the person search system detects the face image included in the frame as the image of the object, but the embodiment is not limited thereto. The image of the object may be any image that can be detected from the frame, can be tracked, and can be collated with the registered image, for example, an image of an automobile (an image of a vehicle main body, an image of a number plate) and an image of a brand name item to be authenticated.

Next, the following describes specific processing performed by the respective components included in the monitoring terminal 100. The imaging unit 101 is arranged to be able to image a face of a person passing through the predetermined position from the front. In the example illustrated in FIG. 1, the monitoring terminal 100 includes one imaging unit 101. Alternatively, the monitoring terminal 100 may include a plurality of imaging units 101 that image the predetermined position from different directions. The tracking unit 102 functions as an example of a detector that detects the face image from the frames constituting the moving image obtained by imaging performed by the imaging unit 101. Specifically, the tracking unit 102 performs scanning on the frame while parallelly moving, rotating, enlarging, or reducing a template of the face image (hereinafter, referred to as a face template). Subsequently, the tracking unit 102 detects, as the face image, a position at which a difference in luminance value from the face template is the smallest on the frame. In this case, the face template is a rectangular average image that is an average of a plurality of face images.

The tracking unit 102 tracks the face images of the same person in continuous frames based on a position of the face image in the frame, a movement amount of the face image between the frames, and the like. Specifically, in a case in which an area in which rectangular face images detected in the continuous frames overlap with each other is equal to or larger than a value set in advance, the tracking unit 102 determines that the face images detected in the continuous frames are face images of the same person. On the other hand, in a case in which the area in which rectangular face images detected in the continuous frames overlap with each other is smaller than the value set in advance, the tracking unit 102 determines that the face images detected in the continuous frames are face images of different persons.

The first best shot selector 103 performs first selection processing, as part of the selection processing set in advance, of selecting the first best shot image from among the face images that are determined to be the face images of the same person by the tracking unit 102. In the present embodiment, the first selection processing selects, from among a plurality of face images tracked as the face images of the same person, a face image occupying a large area in the frame, a face image facing the front, a face image including no variation in facial expression such as smile, or a face image in which eyes are not closed, as the first best shot image. In the present embodiment, the first selection processing is processing of selecting the best shot image with a calculation resource smaller than a calculation resource required for the second selection processing.

For example, in a case of performing, as the first selection processing, processing of selecting the face image occupying a large area in the frame from among a plurality of face images tracked as the face images of the same person, the first best shot selector 103 counts the number of pixels constituting the face image in the frame for each of the face images tracked as the face images of the same person, and obtains the area of the face image in accordance with the counted number. In a case in which the obtained area is equal to or larger than an area set in advance, the first best shot selector 103 selects the face image as the first best shot image. In this case, the first best shot selector 103 counts the number of pixels constituting the face image based on positional information, in the frame, of the face images that are tracked as the face images of the same person by the tracking unit 102. Specifically, the first best shot selector 103 obtains a rectangle including eyes, a nose, and a mouth as characteristic parts of the face image, and calculates the area of the face image in accordance with the number of pixels included in the rectangle. Resolution of the face image having a small area is insufficient, so that accuracy in collation processing with the registered image may be lowered. Thus, by selecting a face image having a large area as the first best shot image, accuracy in collation processing with the registered image can be improved.

In a case of performing, as the first selection processing, processing of selecting the face image facing the front from among a plurality of face images tracked as the face images of the same person, the first best shot selector 103 learns a discriminator that discriminates an angle of the face image using face images facing various directions. Subsequently, the first best shot selector 103 estimates the angle of the face image for each of the face images tracked as the face images of the same person using the learned discriminator. The first best shot selector 103 selects, from among a plurality of face images tracked as the face images of the same person, the face image the estimated angle of which is identical to a predetermined angle, that is, the face image facing the front, as the first best shot image. In this case, the predetermined angle is an angle of the face image set in advance, and is an angle for determining that the face image faces the front.

In a case of performing, as the first selection processing, processing of selecting a face image just as it is including no variation in facial expression from among a plurality of face images tracked as the face images of the same person, the first best shot selector 103 learns a two-class discriminator that discriminates between the face image just as it is and the face image including variation in facial expression, by using the face image just as it is and the face image including variation in facial expression. Subsequently, the first best shot selector 103 estimates whether the face image is the face image just as it is or the face image including variation in facial expression for each of the face images tracked as the face images of the same person using the learned two-class discriminator. The first best shot selector 103 then selects, as the first best shot image, the face image estimated to be the face image lust as it is from among the face images tracked as the face images of the same person. The first best shot selector 103 collects sample face images corresponding to respective face images, that is, a face image including no facial expression, an intermediate face image between a face image including facial expression (for example, a face image of smile) and the face image including no facial expression, and the face image of smile, and sets a degree of smile thereof (for example, 0, 0.5, or 1). Subsequently, the first best shot lector 103 learns a face image having the set degree of smile using support vector regression. Due to this, the first best shot selector 103 can obtain the degree of smile of each of the face images of the same person. The first best shot selector 103 then selects, as the first best shot image, a face image having a low degree of smile (for example, a face image having a degree of smile equal to or smaller than 0.5) from among the face images of the same person. Accordingly, similarity between the face image and the registered image can be prevented from being lowered due to variation in facial expression.

In a case of performing, as the first selection processing, processing of selecting a face image in which eyes are opened from among the face images tracked as the face images of the same person, the first best shot selector 103 learns the two-class discriminator that discriminates between the face image in which eyes are opened and a face image in which eyes are closed, by using the face image in which eyes are opened and the face image in which eyes are closed. Subsequently, the first best shot selector 103 estimates whether the face image is the face image in which eyes are opened or the face image in which eyes are closed for each of the face images tracked as the face images of the same person, by using the learned two-class discriminator. The first best shot selector 103 then selects, as the first best shot image, a face image estimated to be the face image in which eyes are opened from among the face images tracked as the face images of the same person based on an output value of the two-class discriminator (that is, the face image in which eyes are opened or the face image in which eyes are closed). In detecting eyes from the face image, the first best shot selector 103 performs scanning on the face image while parallelly moving, rotating, or reducing a template of human's eyes (hereinafter, referred to as an eye template), and detects, as an eye image, a position at which a difference in luminance value from the eye template is the smallest on the face image. Accordingly, similarity between the face image and the registered image can be prevented from being lowered due to variation in facial expression.

The first best shot selector 103 can select the first best shot image using a plurality of pieces of first selection processing described above. Specifically, the first best shot selector 103 performs the pieces of first selection processing on the face image detected from the frame, and every time the face image is selected as the best shot image, the first best shot selector 103 assigns, to the face image, a weight set in advance for each pieces of the first selection processing. Subsequently, the first best shot selector 103 estimates a degree of best shot (hereinafter, referred to as a best shot degree) from a value obtained by adding the weight assigned to the face image through regression analysis. In this case, the best shot degree is a degree of being suitable for collation with the registered image. In the present embodiment, the best shot degree is a degree of high similarity to the registered image (hereinafter, referred to as personal similarity). The first best shot selector 103 then selects, as the first best shot image, a face image having an estimated best shot degree equal to or larger than a value set in advance. Alternatively, the first best shot selector 103 causes the registered image and the face image detected from the frame to be learning data, causes an area of the face image, a direction of the face image, a degree of smile of the face image, and the like to be variables, and performs learning (for example, a method of least squares) for causing similarity between the face images tracked as the face images of the same person and the registered image to regress to obtain a weight to be assigned based on a selection result of the face image through each of the pieces of first selection processing described above. The first best shot selector 103 selects, as the first best shot image, faces images corresponding to the number set in advance in a descending order of the sum of products of the weight assigned to each piece of first selection processing and the value obtained through the first selection processing (for example, an area of the face image, a direction of the face image, and a degree of smile of the face image).

The first best shot selector 103 may perform, as the first selection processing, processing of selecting the first best hot image from the face images of the same person detected from the frames through regression analysis using, as vector information, a luminance value of the registered image or the second best shot image used for collation processing performed by the collation unit 203.

The first best shot selector 103 previously sets the number N(i) of first best shot images to be selected from the face images of the same person (tracking objects i) and stored in the monitoring terminal 100. The first best shot selector 103 previously sets an upper limit and a lower limit of the number of first best shot images that can be stored in the monitoring terminal 100, and sets the number N(i) within a range thereof. The first best shot selector 103 selects the previously set number N(i) of first best shot images from the tracking objects i, and stores the selected first best shot images in a memory included in the monitoring terminal 100. The first best shot selector 103 may set the number N(i) corresponding to a capacity of the memory included in the monitoring terminal 100. The first best shot selector 103 may set the number N(i) corresponding to a calculation resource that can be used for selecting the first best shot image among calculation resources included in the monitoring terminal 100.

The transmitter 104 transmits, to the server 200, at least one of the first best shot images selected by the first best shot selector 103. The transmitter 104 determines the number K(i) of first best shot images to be transmitted to the server 200 corresponding to a channel capacity between the monitoring terminal 100 and the server 200 or a processing load of the server 200. The transmitter 104 can select the determined number K(i) of first best shot images from among the first best shot images of the same person stored in the memory included in the monitoring terminal 100, and transmit the determined number K(i) of first best shot images to the server 200. The transmitter 104 sets an upper limit and a lower limit of the number K(i) based on a collation result between the second best shot image of the server 200 and the registered image, and sets the number K(i) within a range thereof. For example, in a case in which the number of second best shot images the personal similarity of which to the registered image is higher than similarity set in advance is smaller than the number set in advance, the transmitter 104 increases the number K(i). On the other hand, in a case in which the number of second best shot images the personal similarity of which to the registered image is higher than similarity set in advance is larger than the number set in advance, the transmitter 104 reduces the number K(i).

Next, the following describes specific processing performed by the respective components included in the server 200. The receiver 201 receives at least one first best shot image transmitted from the monitoring terminal 100. The second best shot selector 202 performs second selection processing, as part of the selection processing set in advance other than the first selection processing, of selecting at least one second best shot image from among the received first best hot images. In the present embodiment, the second best shot selector 202 calculates the best shot degree of the received first best shot image using a deep neural network and the like based on a selection result of the second best shot image and the personal similarity as similarity between the second best shot image and the registered image. The second best shot selector 202 then selects, as the second best shot image, an image the best shot degree of which is calculated to be equal to or larger than a predetermined value from among the received first best shot images. Due to this, by performing, by the server 200, the second selection processing that requires a larger calculation resource among a plurality of pieces of selection processing set in advance, the calculation resource and calculation cost required for selecting the best shot image of the monitoring terminal 100 can be further reduced.

Alternatively, the second best shot selector 202 may select, as the second best shot image, the first best shot image having image quality higher than image quality set in advance from among the first best shot images. In this case, the second best shot selector 202 obtains, as an indicator of brightness (an example of image quality), an average value of a pixel value of the face image as the first best shot image, and selects, as the second best shot image, the first best shot image the average value of which is higher than a value set in advance. In the present embodiment, the second best shot selector 202 selects the second best shot image through selection processing of a type different from that of the first selection processing performed by the first best shot selector 103 included in the monitoring terminal 100. Alternatively, the second best shot selector 202 may select the second best shot image through selection processing of the same type as that of the first selection processing. In this case, the second best shot selector 202 can perform the second selection processing using parameters different from those of the first selection processing.

The collation unit 203 includes a storage unit that stores the registered image. The collation unit 203 then performs collation processing of collating the second best shot image with the registered image stored in the storage unit. In the present embodiment, the collation unit 203 calculates the personal similarity as similarity between the second best shot image and the registered image. The collation unit 203 then determines whether a person passing through the predetermined position is a person set in advance based on the calculated personal similarity.

The collation unit 203 also functions as an output unit that outputs a result of collation processing. In the present embodiment, the collation unit 203 outputs the personal similarity calculated for the second best shot image as a result of the collation processing. For example, the collation unit 203 causes a display unit included in the monitoring terminal 100 or the server 200 to display the first test shot image, the second best shot image, the registered image, and the personal similarity.

Based on the collation result between the second best shot image and the registered image, the collation unit 203 (an example of a learning unit) learns parameters of the first selection processing that increase the best shot degree of the first test shot image. Alternatively, the collation unit 203 may learn the parameters of the first selection processing based on the best shot degree of the second best shot image or the personal similarity of the second best shot image input by an administrator and the like of the person search system via an input unit included in the server 200. The collation unit 203 then transmits the learned parameters of the first selection processing to the monitoring terminal 100.

In the present embodiment, the collation unit 203 learns, as the parameters of the first selection processing, the number of pixels constituting the face image selected as the first best shot image, an angle of the face image selected as the first best shot image, facial expression of the face image selected as the first best shot image, a state of eyes (whether eyes are opened) included in the face image selected as the first best shot image, a weight set to the pieces of first selection processing in a case of selecting the first best shot image using a plurality of pieces of first selection processing, and the like. The first best shot selector 103 of the monitoring terminal 100 performs the first selection processing in accordance with the parameters received from the server 200. Due to this, the first best shot image more suitable for collation with the registered image can be selected, so that collation accuracy between the face image detected from the frame and the registered image can be improved.

Based or the collation result between the second best shot image and the registered image, the collation unit 203 learns parameters of the second selection processing that increase the best shot degree of the second best shot image. The second best shot selector 202 may perform the second selection processing in accordance with the parameters learned by the collation unit 203. Due to this, the second best shot image more suitable for collation with the registered image can be selected, so that collation accuracy between the face image detected from the frame and the registered image can be improved.

Figure 2:
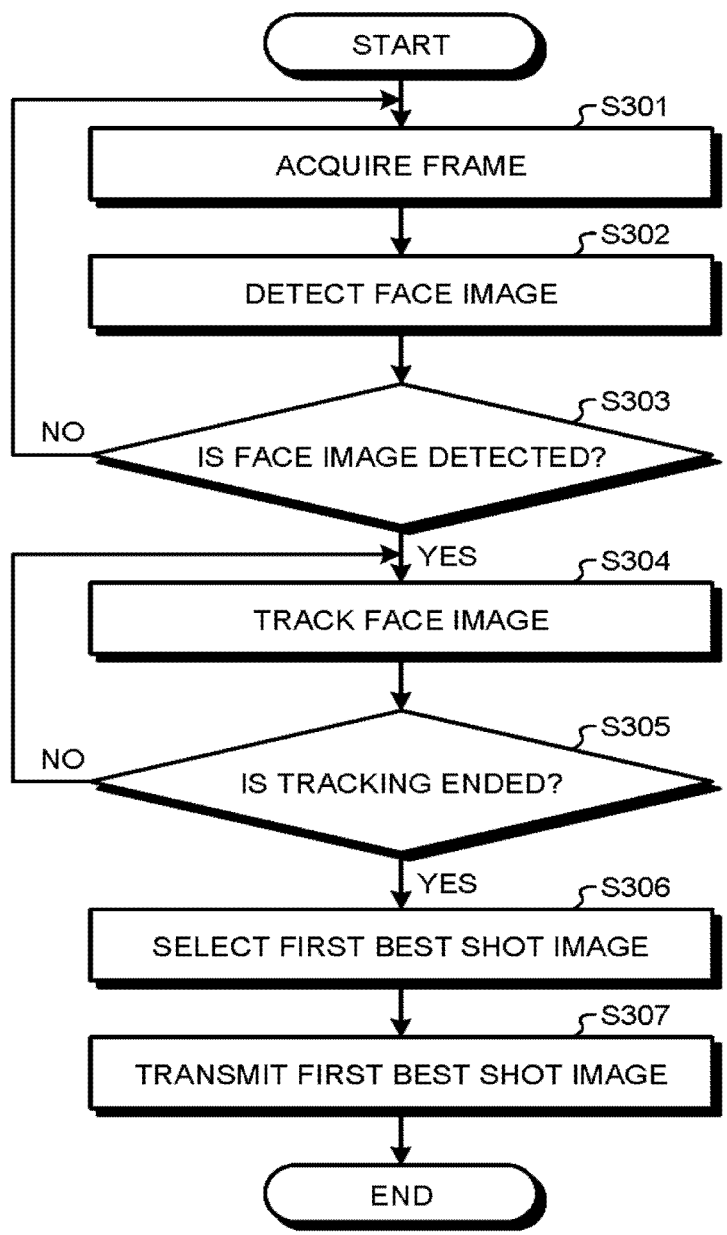
FIG. 2 is a flowchart illustrating an example of a procedure of selection processing for a first best shot image performed by a monitoring terminal according to the first embodiment.

Next, with reference to FIG. 2, the following describes an example of a procedure of selection processing for the first best shot image performed by the monitoring terminal 100 according to the present embodiment. FIG. 2 is a flowchart illustrating an example of the procedure of selection processing for the first best shot image performed by the monitoring terminal according to the first embodiment.

The tracking unit 102 first acquires, from the imaging unit 101, a frame constituting a moving image that is obtained by imaging the predetermined position with the imaging unit 101 (Step S301). Subsequently, the tracking unit 102 detects a face image from the acquired frame (Step S302). The tracking unit 102 then determines whether the face image is detected from the frame (Step S303). If the face image is not detected from the frame (No at Step S303), the process of the tracking unit 102 returns to Step S301, and the tracking unit 102 acquires another frame from the imaging unit 101.

On the other hand, if the face image is detected from the frame (Yes at Step S303), the tracking unit 102 tracks face images of the same person across continuous frames (Step S304). Subsequently, the tracking unit 102 determines whether tracking of the face images of the same person is ended, that is, whether no more face image of the same person is detected from the frame (Step S305). If it is determined that no more face image of the same person is detected from the frames and tracking of the face images of the same person is ended (Yes at Step S305), the first best shot selector 102 performs the first selection processing of selecting the first best shot image from the face images of the same person (Step S306). The transmitter 104 then transmits, to the server 200, at least one first best shot image among the selected first best shot images (Step S307).

Figure 3:
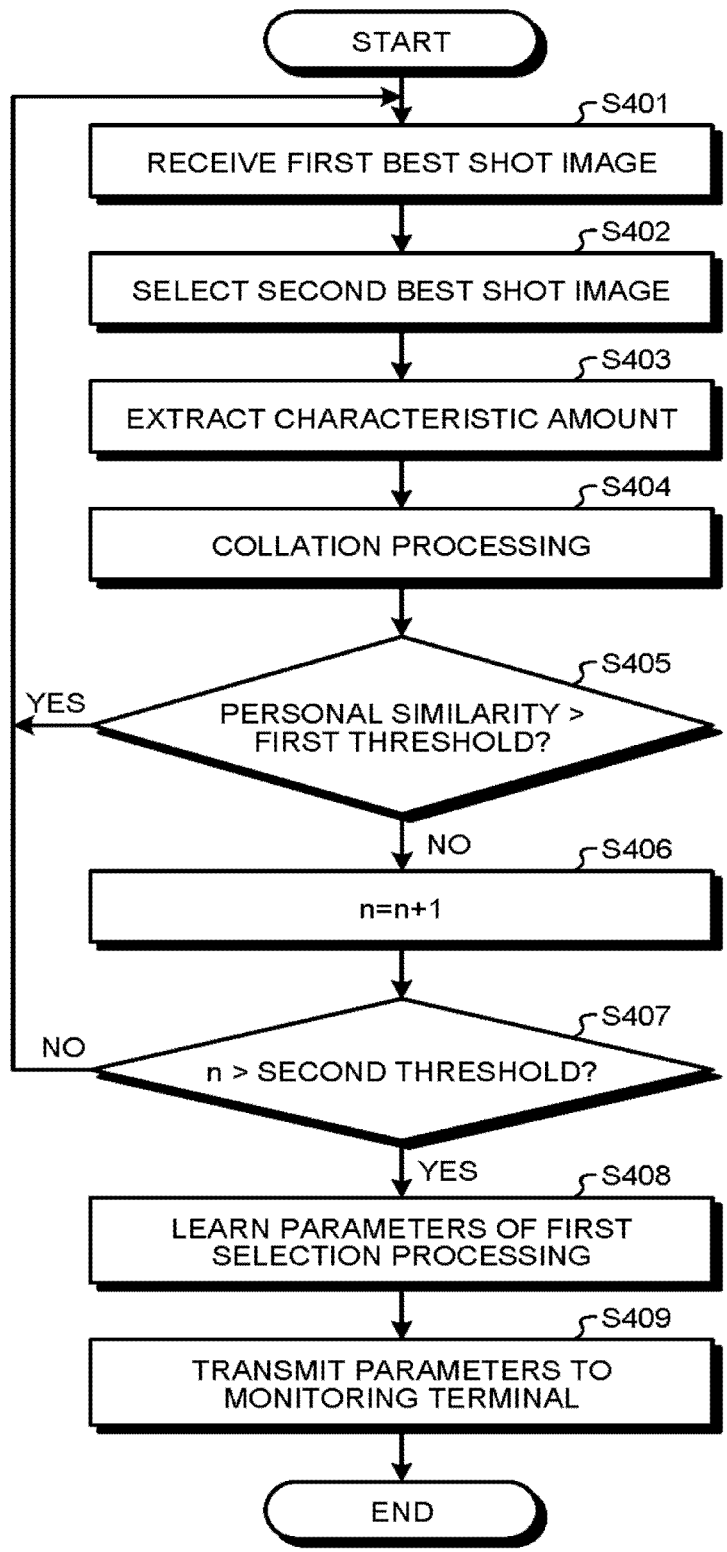
FIG. 3 is a flowchart illustrating an example of a procedure of collation processing performed by a server according to the first embodiment.

Next, with reference to FIG. 3, the following describes an example of a procedure of collation processing performed by the server 200 according to the present embodiment. FIG. 3 is a flowchart illustrating an example of the procedure of collation processing performed by the server according to the first embodiment.

The receiver 201 first receives the first best shot image from the monitoring terminal 100 (Step S401). The second best shot selector 202 performs the second selection processing of selecting the second best shot image from among the received first best shot images (Step S402). The collation unit 203 extracts a characteristic amount of the selected second best shot image (Step S403). The collation unit 203 calculates personal similarity between the characteristic amount of the second best shot image and the characteristic amount of the registered image, and performs the collation processing of determining whether a person passing through the predetermined position is a person set in advance (Step S404). For example, if the personal similarity exceeds a value set in advance, the collation unit 203 determines that the person passing through the predetermined position is the person set in advance.

Subsequently, the second best shot selector 202 determines whether the personal similarity calculated for the second best shot image is larger than a first threshold set in advance (Step S405). If the personal similarity calculated for the second best shot image is larger than the first threshold (Yes at Step S405), the process of the second best shot selector 202 returns to Step S401, and the second best shot selector 202 receives another first best shot image. On the other hand, if the personal similarity calculated for the second best shot image is equal to or smaller than the first threshold (No at Step S405), the second best shot selector 202 increments an image number n that is the number of second best shot images the personal similarity of which is smaller than the first threshold (Step S406). Thereafter, the second best shot selector 202 determines whether the image number n is larger than a second threshold, the second threshold for determining that the parameters of the first selection processing are required to be updated (Step S407).

If it determined that the image number n is larger than the second threshold (Yes at Step S407), the second best shot selector 202 learns, based on a collation result of the second best shot image, the parameters of the first selection processing with which the best shot degree of the first best shot image is increased (Step S408). The second best shot selector 202 transmits the learned parameters to the monitoring terminal 100, and resets the image number n to be 0 (Step S409).

Figure 4:
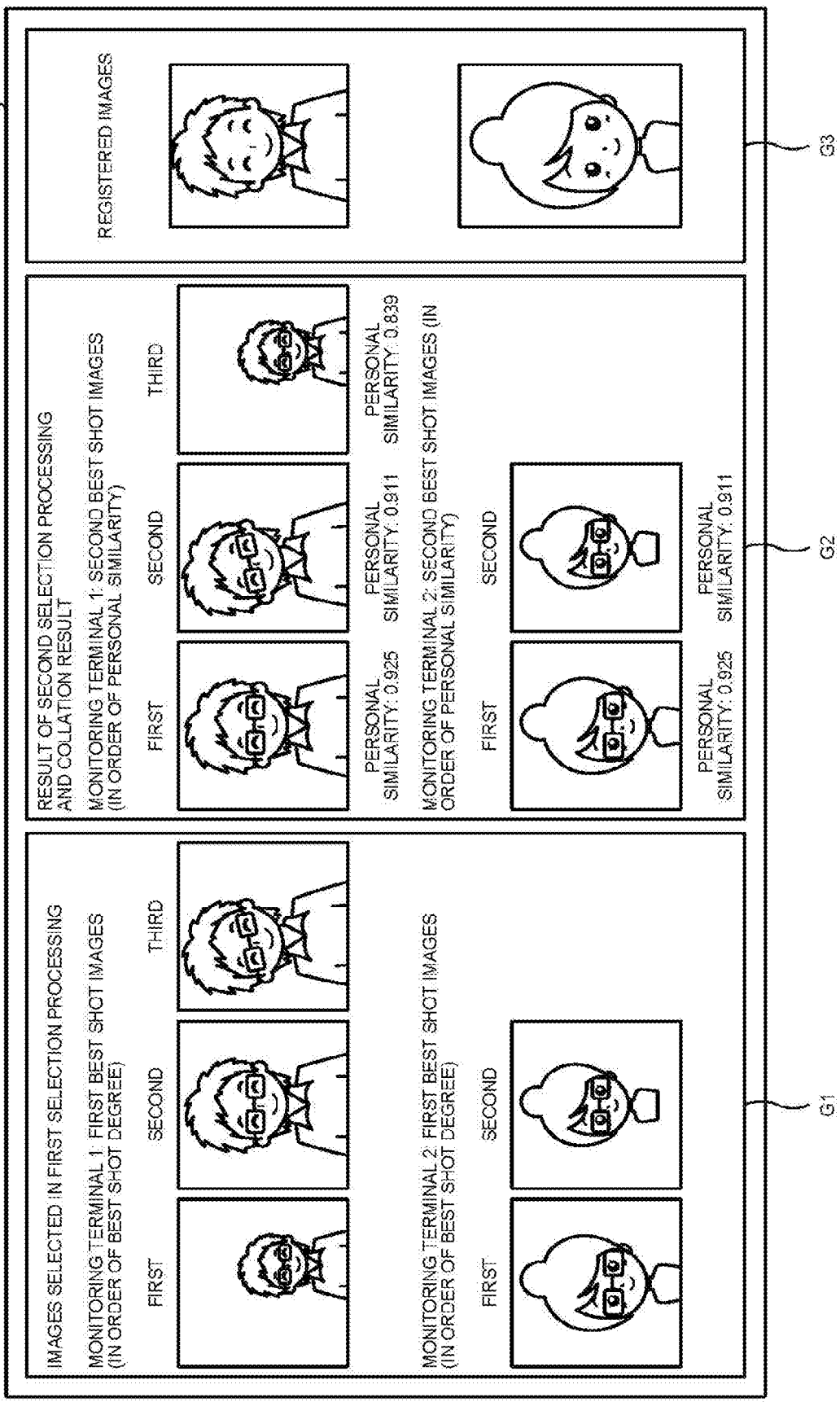
FIG. 4 is a diagram illustrating a display example of a collation result in the person search system according to the first embodiment.

Next, with reference to FIG. 4, the following describes a display example of a collation result in the person search system according to the present embodiment. FIG. 4 is a diagram illustrating a display example of a collation result in the person search system according to the first embodiment.

In the present embodiment, as illustrated in FIG. 4, the collation unit 203 displays a display screen G including a first best shot image list G1 in which the first best shot images received from the monitoring terminal 100 are arranged for each monitoring terminal 100 included in the person search system. In this case, as illustrated in FIG. 4, the collation unit 203 arranges and displays the first best shot images in descending order of the best shot degree.

As illustrated in FIG. 4, the collation unit 203 also displays the display screen G including a second best shot image list G2 in which the second best shot images selected by the second best shot selector 202 are arranged for each monitoring terminal 100. In this case, as illustrated in FIG. 4, the collation unit 203 arranges and displays the second best shot images in descending order of the personal similarity calculated for the second best shot image. As illustrated in FIG. 4, the collation unit 203 may cause the second best shot image list G2 to include the personal similarity calculated for each second best shot image. Additionally, as illustrated in FIG. 4, the collation unit 203 displays the display screen G including a registered image list G3 in which the registered images are arranged.

In this way, with the person search system according to the first embodiment, the selection processing of the best shot image suitable for collation with the registered image is performed by the monitoring terminal 100 and the server 200 in two steps, so that the best shot image to be collated with the registered image is not necessarily selected only by the monitoring terminal 100. Accordingly, the calculation resource and the calculation cost of the monitoring terminal 100 in the collation processing can be reduced.

Second Embodiment

The present embodiment is an example of reading an image from a recording medium carried by a person passing through the predetermined position, and using the read image as the registered image to be collated with the second best snot image. In the following description, the same component as that in the first embodiment is not described.

Figure 5:
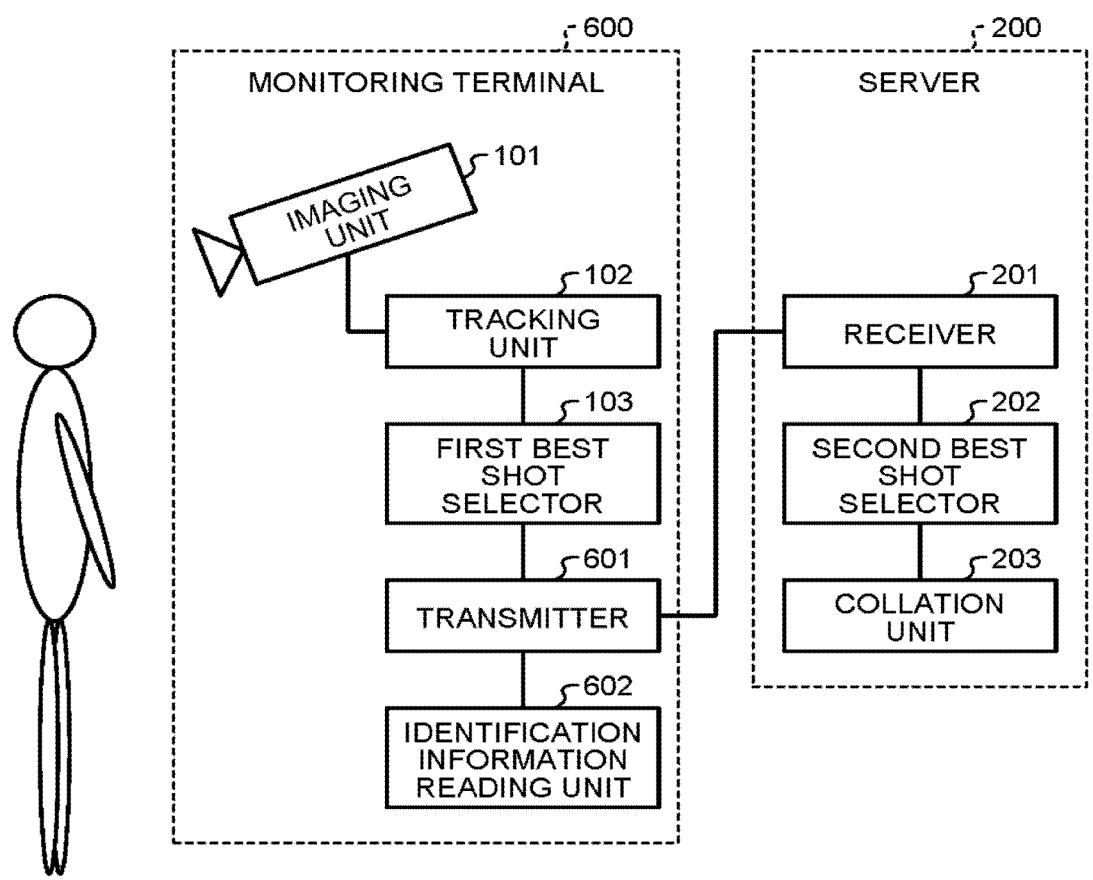
FIG. 5 is a diagram illustrating an example of a configuration of a person collation system to which a monitoring system according to a second embodiment is applied.

FIG. 5 is a diagram illustrating an example of configuration of the person collation system to which the monitoring system according to a second embodiment is applied. In the person collation system according to the present embodiment, as illustrated in FIG. 5, a monitoring terminal 600 includes an identification information reading unit 602 in addition to the imaging unit 101, the tracking unit 102, the first best shot selector 103, and a transmitter 601.

The identification information reading unit 602 reads an image of the object from an ID card (an example of the recording medium) carried by the object passing through the predetermined position. In the present embodiment, the identification information reading unit 602 is installed in a range to he reached from a standing position of the person passing through the predetermined position. The ID card may be, for example, any medium that can record an image of the object such as a passport, a driver's license, a My Number Card, and the like. The identification information reading unit 602 may be a device to which information for acquiring the registered image can be input such as an input device to which identification information that can be known only by the person passing through the predetermined position can be input, and a device for reading biological information such as a fingerprint or a vein.

The transmitter 601 transmits, to the server 200, the image of the object read by the identification information reading unit 602 together with the first best shot image selected by the first best shot selector 103.

The collation unit 203 of the server 200 then performs collation processing of collating the second best shot image with the registered image by using, as the registered image, the image of the object that is received by the receiver 201 together with the first best shot image.

In this way, with the person collation system according to the second embodiment, by performing precise best shot selection processing that takes processing time by the server 200 by reading the image of the object from the recording medium carried by the person passing through the predetermined position and using the read image of the object as the registered image to be collated with the second best shot image, a calculation resource of a person collation terminal (in the present embodiment, the monitoring terminal 600) can be saved.

As described above, according to the first and the second embodiments, the calculation resource and the calculation cost of the monitoring terminals 100 and 600 in the collation processing can be reduced.

A computer program to be executed by the monitoring terminals 100 and 600, and the server 200 according to the present embodiment is embedded and provided in a read only memory (ROM) and the like. The computer program to be executed by the monitoring terminals 100 and 600, and the server 200 according to the present embodiment may be recorded and provided in a computer-readable recording medium such as a compact disc read only memory (CD-ROM), a flexible disk (FD), a compact disc recordable (CD-R), and a digital versatile disc (DVD), as an installable or executable file.

The computer program to be executed by the monitoring terminals 100 and 600, and the server 200 according to the present embodiment may be stored in a computer connected to a network such as the Internet and provided by being downloaded via the network. Furthermore, the computer program to be executed by the monitoring terminals 100 and 600, and the server 200 according to the present embodiment may be provided or distributed via a network such as the Internet.

The computer program to be executed by the monitoring terminals 100 and 600 according to the present embodiment has a module configuration including the components described above (the tracking unit 102, the first best shot selector 103, and the transmitters 104 and 601). As actual hardware, when a central processing unit (CPU) reads out the computer program from the ROM to be executed, the components described above are loaded into a main storage device, and the tracking unit 102, the first best shot selector 103, and the transmitters 104 and 601 are generated on the main storage device.

The computer program to be executed by the server 200 according to the present embodiment has a module configuration including the components described above (the receiver 201, the second best shot selector 202, and the collation unit 203). As actual hardware, when the CPU reads out the computer program from the ROM to be executed, the components des gibed above are loaded into the main storage device, and the receiver 201, the second best shot selector 202, and the collation unit 203 are generated on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring system comprising:
   a monitoring terminal that comprises:
     a detector configured to detect images of an object that are object images from frames constituting a moving image obtained by imaging a predetermined position with an imaging unit;
     a tracking unit configured to track the object images of the same object across the frames;
     a first selector configured to perform first selection processing, as part of predetermined selection processing, of selecting first best shot images suitable for collation with a predetermined image from among the object images of the same object; and
     a transmitter configured to transmit the first best shot images to a server; and
   the server that comprises:
     a receiver configured to receive the first best shot images from the monitoring terminal;
     a second selector configured to perform second selection processing, as part of the predetermined selection processing other than the first selection processing, of selecting a second best shot image suitable for collation with the predetermined image from among the first best shot images;
     a collation unit configured to perform collation processing of collating the second best shot image with the predetermined image; and
     an output unit configured to output a result of the collation processing.

2. The system according to claim 1, wherein
   the collation unit calculates similarity between the second best shot image and the predetermined image;
   the output unit outputs the similarity as a result of the collation processing; and
   in the second selection processing, a best shot degree as a degree of the similarity with respect to the first best shot images based on a selection result of the second best shot image and a calculation result of the similarity, and an image the best shot degree of which is equal to or larger than a predetermined value is selected as the second best shot image from among the first best shot images.

3. The system according to claim 1, wherein
   the monitoring terminal further comprises a reading unit configured to read an image from a recording medium carried by a person passing through the predetermined position,
   the transmitter transmits the first best shot images and the read image to the server, and
   the collation unit collates the read image as the predetermined image with the second best shot image.

4. The system according to claim 2, wherein the server further comprises a learning unit configured to learn parameters of the first selection processing with which the best shot degree of the first best shot images is increased based on a collation result between the second best shot image and the predetermined image, and transmit the parameters to the monitoring terminal.

5. The system according to claim 4, wherein the first selector performs the first selection processing in accordance with the parameters received from the server.

* * * * *